United States Patent [19]

Current

[11] 4,390,962

[45] Jun. 28, 1983

[54] LATCHED MULTIVALUED FULL ADDER

[75] Inventor: Karl W. Current, Davis, Calif.

[73] Assignee: The Regents of the University of California, Berkeley, Calif.

[21] Appl. No.: 133,836

[22] Filed: Mar. 25, 1980

[51] Int. Cl.³ .............................................. G06F 7/49
[52] U.S. Cl. .................................................. 364/768
[58] Field of Search ............................. 364/768, 700

[56] References Cited

U.S. PATENT DOCUMENTS

| | | | |
|---|---|---|---|
| 3,543,296 | 11/1970 | Gardner et al. | 340/173 |
| 3,659,090 | 4/1972 | Tomozewa | 364/784 |
| 3,749,899 | 7/1973 | Kohoutek et al. | 364/716 |
| 3,761,902 | 9/1973 | Weinberger | 340/273 FF |
| 4,025,909 | 5/1977 | Brickman | 340/173 FF |

OTHER PUBLICATIONS

Smith, "Circuits for Multiple Valued Logic", *1976 International Symposium on Multiple Valued Logic Proceeding*, 1976, pp. 30-43.
Current, "Four-Valued Threshold Logic Full Adder Circuit Implementation", 1978 *International Symposium on Multi-Valued Logic*, May 1978.
Vacca, "A Three Valued System of Logic & Its Applications to Base Three Digital Circuits", *Logic Design of Computers*.

Primary Examiner—David H. Malzahn
Attorney, Agent, or Firm—Phillips, Moore, Lempio & Majestic

[57] ABSTRACT

A synchronous latched multivalued full adder for processing a first input current having any one of a plurality of multivalues, including a quantizer for receiving current, for generating a sum logical output current and a carry logical output current being a quantization of the received current, and for regenerating the received current from the sum and carry logical output current as an output, an input line for directing the input current to the quantizer as the received current, a feedback line for directing the regenerated current back to the quantizer as the received current, and a clock controlled switching device for coupling the input line to the quantizer while decoupling the feedback line from the quantizer during a setup mode and for decoupling the input line from the quantizer while coupling the feedback line to the quantizer during a hold mode.

14 Claims, 4 Drawing Figures

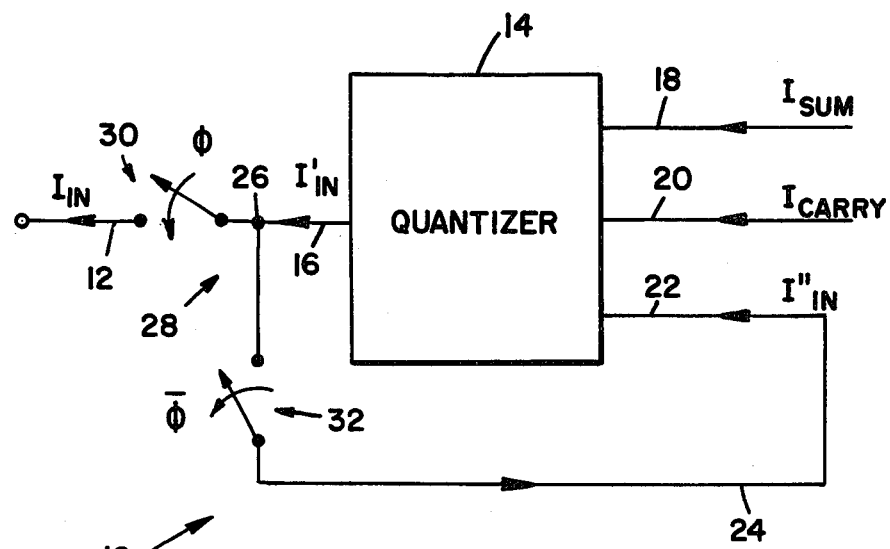
FIG_1
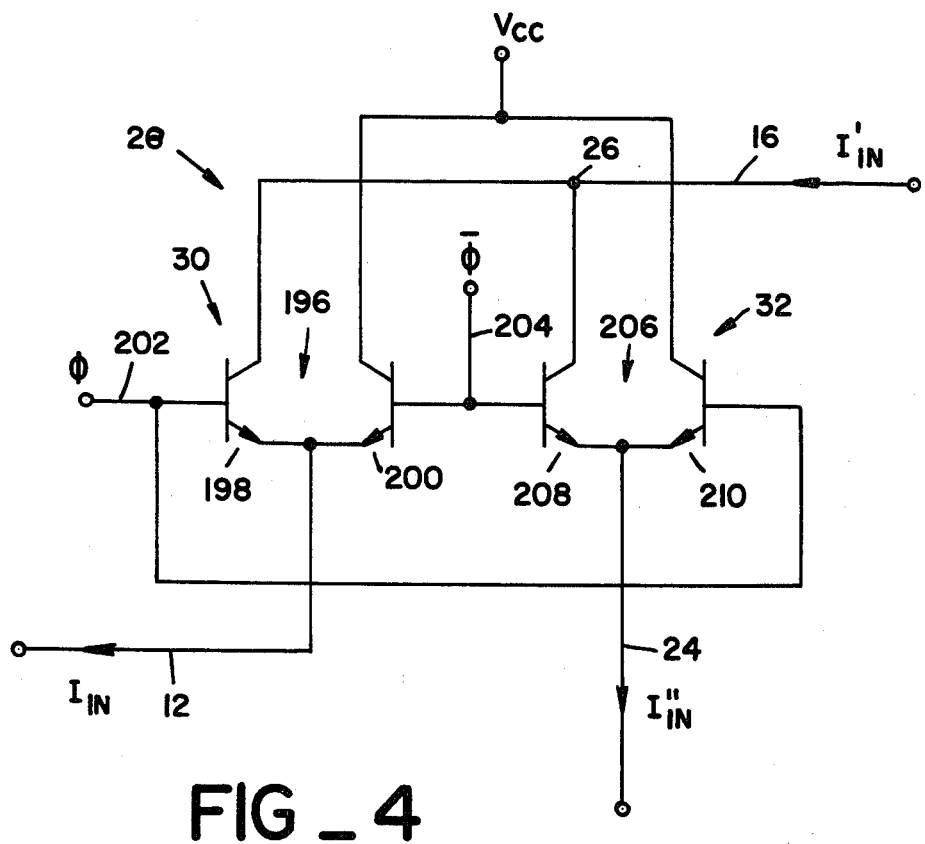
FIG_4

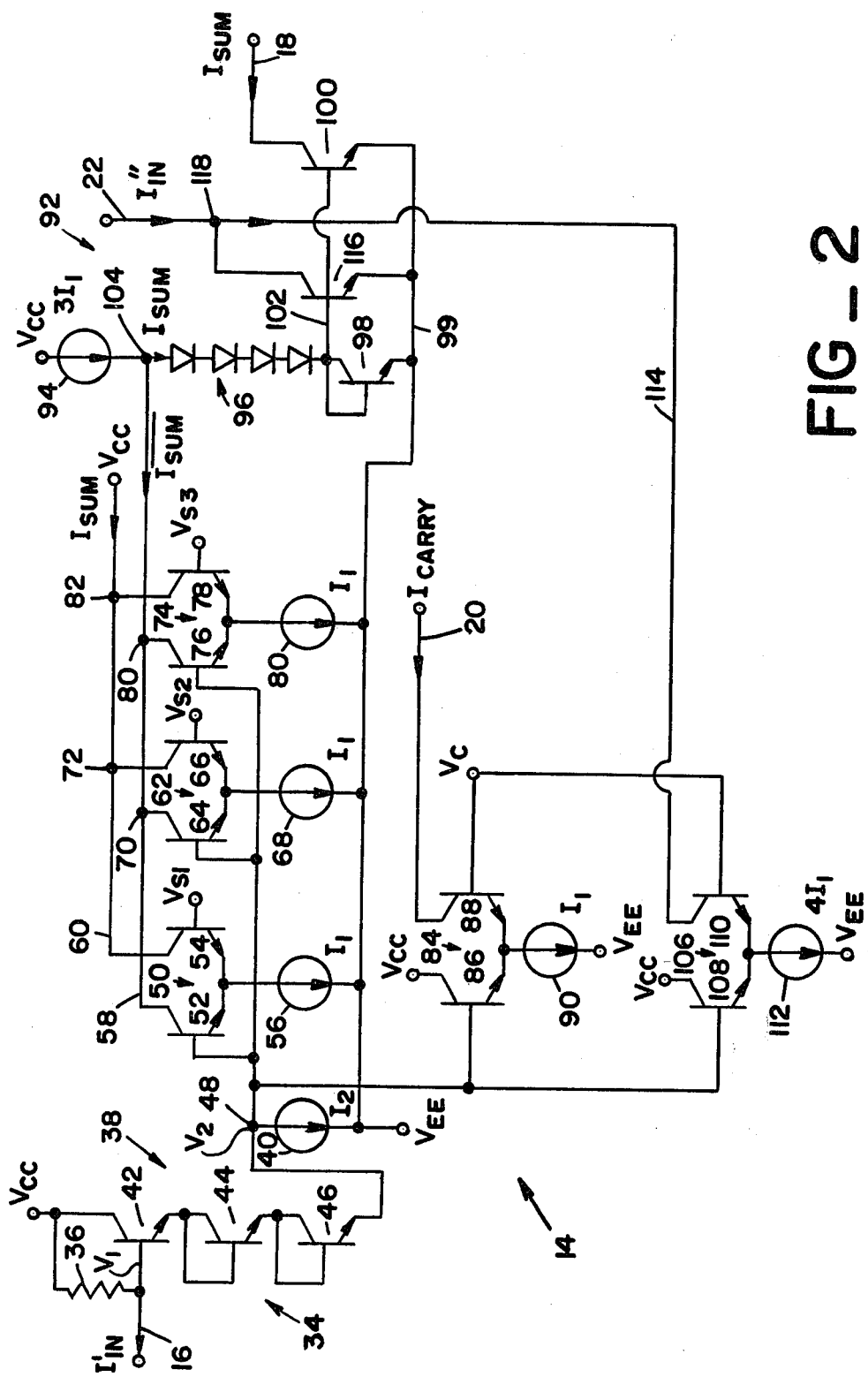
FIG_2

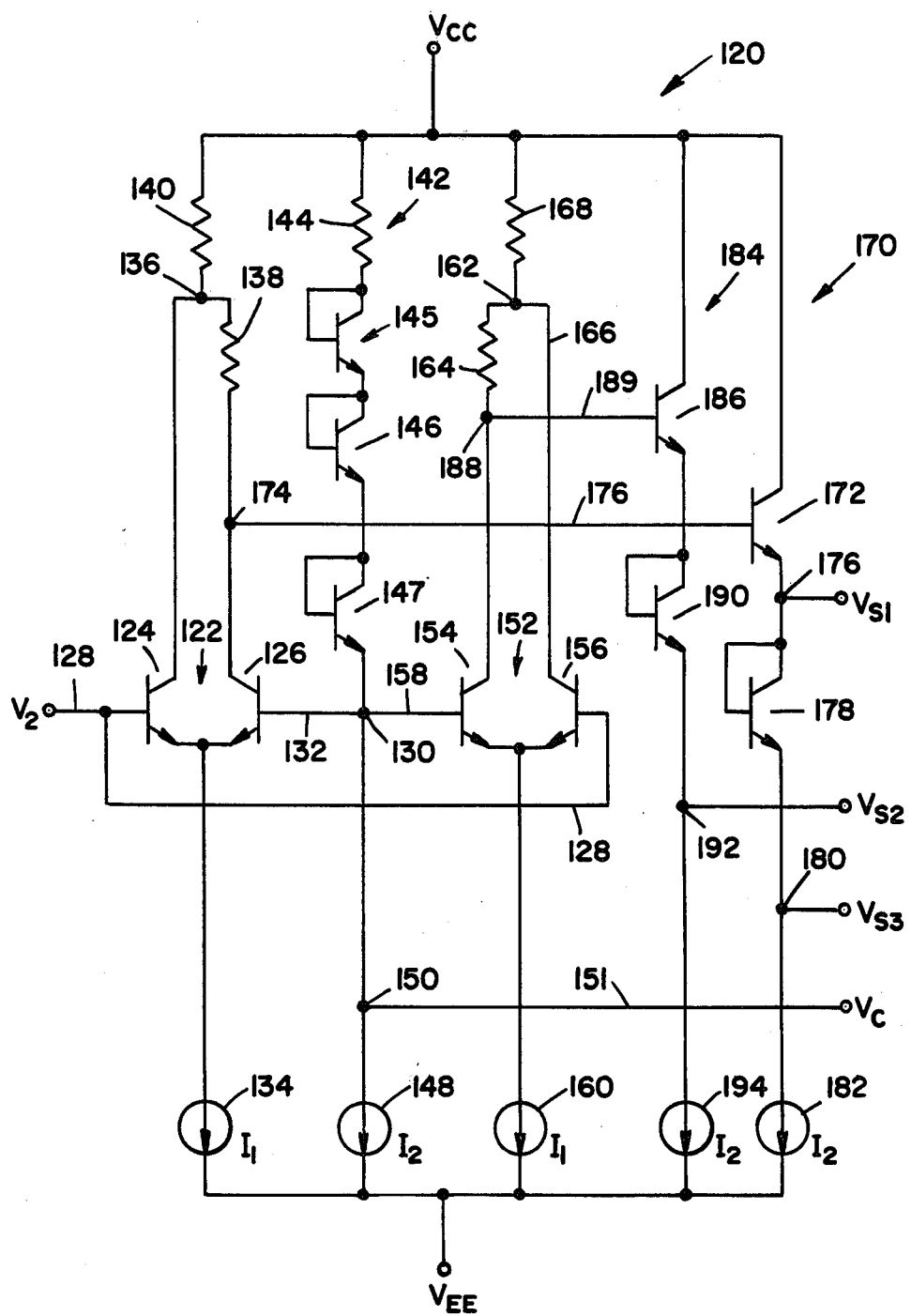
FIG_3

LATCHED MULTIVALUED FULL ADDER

BACKGROUND ART

This invention relates generally to an arithmetic operator used for digital processing circuits and more particularly to a synchronous latched multivalued full adder.

Digital signal processing circuits are being implemented as large-scale-integrated (LSI) circuits on chips by using conventional photomasking and silicon surface processing technology. The size and complexity of some LSI circuits have grown to the extent that this conventional technology is a limitation on the ability to integrate them on the chips. That is, the number of transistors and resistors, together with the number of metal signal line interconnections, that can be integrated on a chip of given size is limited by this technology.

Typically, the LSI circuits on the chip embody binary logic processing binary signals. Since the binary signals may assume only two states, i.e., logic 0 or logic 1, the amount of information on the metal signal line interconnections carrying these signals is limited. If the circuits must process greater amounts of information, the number of metal signal line interconnections must increase.

As an alternative to binary logic, multivalued logic is being considered for use on LSI circuits. The term "multivalued" is used in the art to mean signals that may assume more than two states, i.e., three or more. For example, a quaternary or 4-valued logic circuit is a circuit that processes a signal that may assume any one of four states of logic 0, logic 1, logic 2, or logic 3. A signal that may assume four states thus contains twice the amount of information of a binary signal which can assume only two states. Consequently, multivalued logic circuits can be implemented with fewer metal signal line interconnections than binary logic circuits, since each metal signal line interconnection can carry signals having more information than binary logic circuits. As a corollary, the same number of metal signal line interconnections may be used on a chip of a given size as for binary logic, but with an increase in signal processing capability.

While conventional multivalued logic circuits have the advantage of reducing the number of metal signal line interconnections that is required for a given LSI circuit, the number of transistors and resistors that is required to implement the circuit is not necessarily reduced. Therefore, there is still a limitation on the size and complexity of LSI processing circuits that can be implemented on a chip of given size. This is not insignificant since a circuit may require many thousands and tens of thousands of integrated transistors and resistors.

For example, in performing an arithmetic function, such as an add function, a quaternary logic full adder adds two 4-valued inputs A and B, and a binary input $C_i$, which is a carry input, to yield a 2-digit, base-four output word CS, where C is the carry and S is the sum. In performing this function, the full adder decodes the total value of the sum of inputs A, B and $C_i$ to produce the sum S and the carry C. Thereafter, the storage of the sum S and carry C outputs is usually done in two separate latches. As a result, a number of transistors and resistors is required by the full adder to perform its function, while an additional number of transistors and resistors is required for each latch to perform the storage function. A complex LSI circuit will usually have many such full adders and latches.

SUMMARY OF THE INVENTION

It is an object of the invention to be able to implement digital processing circuits of increased size and complexity on a chip of a given size.

It is another object of the present invention to be able to reduce the number of transistors, resistors and metal signal line interconnections required to implement digital processing circuits on a chip of given size.

Yet another object of the present invention is to utilize multivalued logic technology to reduce such a number of transistors, resistors and metal signal line interconnections.

These and other objects of the present invention are obtained through the use of a synchronous latched multivalued full adder for processing a first input current having any one of a plurality of multivalues, including quantizer means, having an input, a first sum output, a second carry output and a third output, for generating a sum logical output current at the first sum output and a carry logical output current at the second carry output in response to current being received at the input and for regenerating the received current in response to the sum logical output current and the carry logical output current to produce a second regenerated current on the third output. Also included are means for directing the first input current to the input of the quantizer means, feedback means for directing the regenerated current from the third output to the input of the quantizer means, and clock controlled switch means for decoupling the input current directing means or the feedback directing means from the input of the quantizer means to direct the second regenerated current or the first input current to the input of the quantizer means as the received current.

BRIEF DESCRIPTION OF THE DRAWINGS

FIG. 1 is a block diagram of the present invention.

FIG. 2 is a schematic illustration of a quantizer of the present invention.

FIG. 3 is a schematic illustration of a switching threshold voltage circuit of the present invention.

FIG. 4 is a schematic illustration of a clock controlled switch of the present invention.

DETAILED DESCRIPTION OF THE INVENTION

FIG. 1 shows a latched multivalued full adder 10 for adding and latching data. The full adder 10 will be specifically described as a synchronous latched quaternary full adder for processing an input signal that may assume any one of eight logical values 0–7 and has carry and sum output information. However, the invention applies generally to "multivalued" circuits in which the input signal being processed can assume three or more logical values, i.e., not binary.

The adder 10 has an input line 12 that carries an input current $I_{in}$ that can assume any one of eight logical values 0–7 and which represents the addition of two four-valued signals A and B and a binary carry $C_i$. A quantizer 14 has an input 16 for receiving current $I'_{in}$ from the input line 12, together with an output 18, an output 20 and an output 22. Quantizer 14 decodes or quantizes the value of the current $I'_{in}$ to produce an output current $I_{sum}$ on output 18 which is the logical sum of the adder 10, an output current $I_{carry}$ on output 20 which is the logical carry of the adder 10, and a current $I''_{in}$ on output 22. The current $I''_{in}$ is a regenerated current that is produced from the current $I_{sum}$ and current $I_{in}$ and has a value that is the same value as the value of the input current $I_{in}$. A positive feedback line 24 is coupled between the output 22 and the input 16 via a junction 26 to direct the regenerated current $I''_{in}$ to the input 16 as current $I'_{in}$.

A clock controlled switching device 28 has a switch 30 coupled to the input line 12 and a switch 32 coupled to the feedback line 24. A clock signal $\phi$ and a clock signal $\overline{\phi}$ are simultaneously generated to control the switching of switch 30 and switch 32, respectively. When signal $\phi$ is high, switch 30 is closed to couple the input line 12 directly to the input 16 of quantizer 14. Simultaneously, clock signal $\overline{\phi}$ is low to open the switch 32 and decouple feedback line 24 from the input 16. When clock signal $\phi$ is low, switch 30 is opened to decouple input line 12 from input 16 and, simultaneously, clock signal $\overline{\phi}$ is high to close switch 32 and directly couple feedback line 24 to input 16.

Thus, when clock signal $\phi$ is right, the input line 12 directs input current $I_{in}$ to input 16 as the received current $I'_{in}$. When clock signal $\overline{\phi}$ is high, feedback line 24 is coupled to input 16 to direct the regenerated current $I''_{in}$ to input 16 as the received current $I'_{in}$. Clock signal $\phi$ is high in a setup mode of the adder 10 to input to the quantizer 14 the current $I_{in}$. In this mode, the received current $I'_{in}$, which is the input current $I_{in}$, is decoded and quantized by quantizer 14, and then coupled to output 18 and output 20 to provide sum and carry information as current $I_{sum}$ and current $I_{carry}$. Then, in a hold mode, clock signal $\overline{\phi}$ goes high to couple the regenerated current $I''_{in}$ to line 16 as received current $I'_{in}$, which is decoded and quantized by quantizer 14 in a similar manner. Thus, in the hold mode with the regenerated current $I''_{in}$ being fed back to input 16 and the input line 12 being decoupled from input 16, the current $I_{sum}$ and the current $I_{carry}$ are stored or latched statically in the adder 10.

FIG. 2 shows the quantizer 14 having the input 16, the output 18 carrying the current $I_{sum}$, the output 20 carrying the current $I_{carry}$ and the output 22 carrying the regenerated current $I''_{in}$. A voltage generating circuit 34 is connected between voltage $V_{CC}$ and voltage $V_{EE}$ and includes a resistor 36, emitter follower 38, and a current source 40 which produces or draws a current $I_2$. The emitter follower 38 includes a transistor 42 having its base coupled to input 16, a transistor 44, and a transistor 46 whose emitter is coupled to a junction 48. The current $I'_{in}$ being received on input 16 is converted by resistor 36 to a voltage of level $V_1$ which is level shifted down by emitter follower 38, to form a voltage $V_2$ at junction 48. This voltage $V_2$ thus is proportional to the value of the current $I'_{in}$ being received on input 16.

A thresholded differential pair of transistors 50 includes a transistor 52 and a transistor 54. Transistor 52 has its base coupled to junction 48 and is biased by the voltage $V_2$. Transistor 54 has a voltage threshold at its base of value $V_{S1}$. The emitter of transistor 52 and the emitter of transistor 54 are coupled in common to a current source 56 which draws one unit of current $I_1$. The collector of transistor 52 is coupled to a summing line 58 which carries a complemented logical sum current $\overline{I_{sum}}$. The collector of transistor 54 is coupled to a summing line 60 which carries the uncomplemented logical sum current $I_{sum}$.

A thresholded differential pair of transistors 62 includes a transistor 64 and a transistor 66. Transistor 64 has its base coupled to the junction 48 to be biased by the voltage $V_2$, while transistor 66 has its base carrying a threshold voltage of value $V_{S2}$. The emitter of transistor 64 and the emitter of transistor 66 are coupled in common to a current source 68 which draws one unit of current $I_1$. The collector of transistor 64 is coupled to summing line 58 at a summing junction 70 and the collector of transistor 66 is coupled to the summing line 60 at a summing junction 72.

A thresholded differential pair of transistors 74 includes a transistor 76 and a transistor 78. Transistor 76 has its base coupled to the junction 48 and is biased by the voltage $V_2$, whereas transistor 78 has its base carrying a threshold voltage of value $V_{S3}$. The emitter of transistor 76 and emitter of transistor 78 are coupled in common to a current source 80 which draws one unit of current $I_1$. The collector of transistor 76 is coupled to the summing line 58 via a summing junction 80 and the collector of transistor 78 is coupled to the summing line 60 via a summing junction 82.

The current $I'_{in}$, as already mentioned, can have any value of logic 0-7. For reasons which will become apparent, the current $I'_{in}$ can be considered to be divided into two ranges of logic 0-3 and logic 4-7. Voltages $V_{S1}$, $V_{S2}$, $V_{S3}$ are at distinct levels from one another for each such range. However, also for reasons which will become apparent, and as will be discussed in connection with FIG. 3, voltages $V_{S1}$, $V_{S2}$, $V_{S3}$ are shifted the same amount when current $I'_{in}$ changes from one range to the other.

A thresholded differential pair of transistors 84 includes a transistor 86 having its base coupled to the junction 48 to be biased by voltage $V_2$, and a transistor 88 having its base carrying a voltage threshold of voltage $V_C$. The emitter of transistor 86 and the emitter of transistor 88 are coupled in common to a current source 90 which draws one unit of current $I_1$. The collector of transistor 86 is coupled to voltage $V_{CC}$ while the collector of transistor 88 is coupled to output 20. Voltage $V_C$ is at a level corresponding to logic 4.

In operation of this part of the quantizer 14, assume, for example, that the current $I'_{in}$ on input 16 has a value of logical 0. Also assume that the voltage thresholds provided by voltages $V_{S1}$, $V_{S2}$ and $V_{S3}$ have been shifted the same amount to their respective levels for this input range. Finally, also assume that as a result of the current $I'_{in}$ on input 16 being a logic 0, the voltage $V_2$ at junction 48 is greater than each voltage $V_{S1}$, $V_{S2}$, $V_{S3}$, as well as voltage $V_C$.

Since voltage $V_2$ is greater than voltage $V_{S1}$, transistor 52 will turn on resulting in one unit of current $I_1$ being drawn on summing line 58 by source 56. With transistor 54 being turned off, 0 units of current $I_1$ will be drawn on line 60. Similarly, transistor 64 will be turned on and transistor 66 will be turned off so that another one unit of current $I_1$ will be drawn by source 68 on summing line 58 and 0 units of current drawn on summing line 60. Also similarly, transistor 76 will be turned on and transistor 78 turned off so that yet a third unit of current $I_1$ will be drawn by source 80 on summing line 58 and 0 units of current drawn on summing line 60. Consequently, line 60 now carries the current $I_{sum}$ which is a logic 0 corresponding to the current $I'_{in}$ being received on input 16. However, summing line 58 carries three units of current $3I_1$ which is $\overline{I_{sum}}$ of logic 3.

Also, voltage $V_2$ is greater than voltage $V_C$. Therefore, transistor 86 will be turned on to draw one unit of current $I_1$ via source 90 and transistor 88 will be turned off so that 0 units of current $I_1$ will be drawn on output 20. Thus, output 20 carries the current $I_{carry}$ of logic 0.

A converter 92 converts the logical current $\bar{I}_{sum}$ to the current $I_{sum}$ that is provided on output 18. Converter 92 includes a current source 94 which produces three units of current $3I_1$, a plurality of diodes 96, and a transistor 98 that is biased by the output of diodes 96 and whose emitter is coupled to a line 99. A transistor 100 is biased on by the output of diodes 96 over a line 102, as shown, and has its emitter coupled to line 99. Source 94 is coupled to the summing line 58 via a junction 104.

In operation, and in keeping with the above example of a logic 0 as current $I'_{in}$, the three units of current on line 58 are drawn from source 94 via junction 104, which results in 0 units of current $I_1$ being drawn through transistor 98, onto line 99 and transistor 100 being turned off. Consequently, the current $I_{sum}$ is a logic 0, consistent with the received current $I'_{in}$ at input 16. As already mentioned, the current $I_{carry}$ also is a logic 0 on output 20. Therefore, a two-digit output 00 is produced on output 20 and output 18 corresponding respectively to the carry and sum digits.

As another example, assume that the current $I'_{in}$ being received at input 16 has a value of 6 or logic 6. Also assume that since this is in the range logic 4–logic 7, the voltages $V_{S1}, V_{S2}, V_{S3}$ have been level shifted in accordance with the circuit of FIG. 3 to be described and that voltage $V_2$ is less than voltage $V_{S1}$ and voltage $V_{S2}$, but greater than voltage $V_{S3}$. Therefore, transistor 54 will be turned on and transistor 52 turned off so that one unit of current $I_1$ will be drawn by source 56 on summing line 60 and 0 units of current from source 56 drawn on summing line 58. Similarly, transistor 66 will be turned on and transistor 64 turned off so that another unit of current $I_1$ will be drawn on line 60 and 0 units of current drawn on line 58 from source 68. However, transistor 76 will be turned on and transistor 78 turned off so that one unit of current $I_1$ will be drawn by source 80 on summing line 58 and 0 units of current drawn on line 60 from source 80. Consequently, the value of current $I_{sum}$ on line 60 will be logic 2 while the value of logic current $\bar{I}_{sum}$ on line 58 will be logic 1.

The one unit of current $\bar{I}_{sum}$ on line 58 is drawn from source 94, leaving two units of current $2I_1$ which are drawn through transistor 98 onto line 99. Also transistor 100 is turned on so that it draws two units of current $2I_1$ on line 99 and on output 18, whereby $I_{sum}$ is a value of logic 2.

Also, in this example voltage $V_2$ is less than voltage $V_C$; therefore, transistor 88 is turned on and transistor 86 is turned off, whereby one unit of current $I_1$ is drawn by source 90 on output 20. Thus, the current $I_{carry}$ at output 20 is logic 1 and the current $I_{sum}$ at output 18 is a logic 2, which corresponds to a base-4 count of the logic 6 input or an input value of 6.

To produce the regenerated current $I''_{in}$ at output 22, quantizer 14 has a thresholded differential pair of transistors 106 having a transistor 108 and a transistor 110. Transistor 108 has its base coupled to the junction 48 to be biased by the voltage $V_2$. Transistor 110 has its base biased by the voltage $V_C$. The emitter of transistor 108 and the emitter of transistor 110 are coupled in common to a current source 112 which draws four units of current $4I_1$. The collector of transistor 108 is coupled to source $V_{CC}$. The collector of transistor 110 is coupled over a line 114 to output 22. Also, a transistor 116 has its base coupled to the output of diodes 96 and an emitter coupled to line 99, with the collector being coupled to line 114 via a summing junction 118.

In accordance with the above example in which the current $I'_{in}$ being received at input 16 is 0, voltage $V_2$ exceeds the voltage $V_C$, whereby transistor 108 is turned on and transistor 110 is turned off. Consequently, 0 units of current $I_1$ are drawn on line 114. Also, transistor 116 will be turned off so that 0 units of current are added at junction 118, whereby the regenerated current $I''_{in}$ at output 22 has a value of 0, corresponding to the current $I'_{in}$.

In the other example, in which current $I'_{in}$ has a value of 6, the voltage $V_2$ will be less than voltage $V_C$, whereby transistor 110 will be turned on and transistor 108 turned off. Consequently, four units of current $4I_1$ will be drawn by source 112 on line 114. Also, transistor 116 will be turned on to draw 2 units of current. Consequently, at summing junction 118, 6 units of current are produced, whereby the value of the current $I''_{in}$ at output 22 is logic 6 corresponding to an input value of 6.

FIG. 3 shows a circuit 120 for generating voltages $V_{S1}, V_{S2}, V_{S3}$ and for level shifting these voltages the same amount when the value of the current $I'_{in}$ at input 16 changes between ranges logic 0–logic 3 and logic 4–logic 7.

A thresholded differential pair of transistors 122 includes a transistor 124 and a transistor 126. Transistor 124 has its base coupled to a line 128 so as to be biased by the voltage $V_2$. Transistor 126 has its base coupled to a junction 130 over a line 132 to be biased by voltage $V_C$. The emitter of transistor 124 and emitter of transistor 126 are coupled in common to a current source 134 which draws current $I_1$. The collector of transistor 124 is coupled directly to a junction 136, while the collector of transistor 126 is coupled to junction 136 through a resistor 138. A resistor 140 is coupled between the junction 136 and voltage $V_{CC}$.

A line 142 is coupled between voltage $V_{CC}$ and voltage $V_{EE}$ and has a resistor 144, emitter follower transistors 145, 146, 147, and a current source 148 drawing current $I_2$. This line 142 produces voltage $V_C$ at junction 130 between transistor 147 and source 148. Voltage $V_C$ is taken out via a junction 150 and a line 151 for coupling to the base of transistor 88 and transistor 110 shown in FIG. 2.

A thresholded differential pair of transistors 152 includes a transistor 154 and a transistor 156. Transistor 154 is base biased by voltage $V_C$ at junction 130 over a line 158, while transistor 156 is base biased by voltage $V_2$ on the line 128. The emitter of transistor 154 and the emitter of transistor 156 are coupled in common to a current source 160 which draws current $I_1$. The collector of transistor 154 is coupled to a junction 162 through a resistor 164, while the collector of transistor 156 is coupled directly to junction 162 over a line 166. A resistor 168 is coupled between junction 162 and source $V_{CC}$. Resistor 138 and resistor 164 can be the same value, but resistor 140 and resistor 168 should be of different values from one another.

A line 170, coupled between voltage $V_{CC}$ and voltage $V_{EE}$, is used to generate voltage $V_{S1}$ and voltage $V_{S3}$. Line 170 includes a transistor 172 having a base coupled to a junction 174 over a line 176. Junction 174 is coupled between resistor 138 and the collector of transistor 126. The emitter of transistor 172 is coupled to a junction 176 at which voltage $V_{S1}$ is taken out. A transistor 178 is connected to transistor 172 and has its emitter coupled to a junction 180 at which voltage $V_{S3}$ is taken out. A current source 182 on line 170 draws current $I_2$ to produce voltage $V_{S1}$ and voltage $V_{S3}$. Transistor 172 and transistor 178, as shown, constitute emitter follower transistors.

A line 184, connected between source $V_{CC}$ and voltage $V_{EE}$, is used to produce the voltage $V_{S2}$. A transistor 186 has its base coupled to a junction 188 over a line 189. Junction 188 is connected between resistor 164 and the collector of transistor 154. A transistor 190 is connected to transistor 186 and has its emitter coupled to a junction 192 at which voltage $V_{S2}$ is taken out. A current source 194 draws current $I_2$ on line 184 to produce voltage $V_{S2}$. Transistor 186 and transistor 190, as shown, constitute emitter follower transistors.

In the operation of circuit 120, as can be seen by line 142, the voltage $V_C$ is constantly being generated and is preset with resistor 144 to a level of logic 4. Assume that the current $I'_{in}$ at input 16 and the resulting voltage $V_2$ are at a value in a range of logic 4-logic 7, i.e., $V_2 < V_C$. As a result, transistor 126 will be turned on and transistor 124 turned off. Consequently, current will be drawn by source 134 from voltage $V_{CC}$, through resistor 140, junction 136, resistor 138 which produces a voltage drop, junction 174 and transistor 126 to voltage $V_{EE}$. The resulting voltage produced at junction 174 is level shifted by emitter follower transistors 172, 178 to form voltage $V_{S1}$ and voltage $V_{S2}$ for this input range.

Also, transistor 154 is turned on while transistor 156 is turned off. Therefore, current will be drawn by source 160 from $V_{CC}$ through resistor 168, junction 162, resistor 164 which produces a voltage drop, and transistor 154 to $V_{EE}$. The resulting voltage produced at junction 188 is level shifted by emitter follower transistors 186, 190 and voltage $V_{S2}$ is produced at junction 192 for this input range.

Assume now that the current $I'_{in}$ and resulting voltage $V_2$ has a value in the range of logic 0-logic 3, i.e. $V_2 > V_C$. Consequently, transistor 124 will be turned on and transistor 126 turned off. Therefore, source 134 will draw current from $V_{CC}$ through resistor 140, junction 136 and transistor 124, bypassing resistor 138 and junction 174. Therefore, the voltage drop across resistor 138 is 0, so that the level shifting of the voltage at junction 174 produced by emitter follower transistors 172, 178 is still the same, but new values of voltage $V_{S1}$ and voltage $V_{S3}$ are produced for this input range. Similarly, transistor 156 is turned on while transistor 154 is turned off. Therefore, source 160 will draw current from $V_{CC}$ through resistor 168, junction 162 and transistor 156, bypassing resistor 164 and junction 188. Therefore, the voltage drop across resistor 164 is 0, so that the level shifting of the voltage at junction 188 produced by emitter follower transistors 186, 190 is still the same, but a new value of voltage $V_{S2}$ is produced for this input range.

FIG. 4 shows the clock controlled switch 28 along with the input line 12, the input 16 to quantizer 14, the feedback line 24 and the junction 26. The switch 30 of clock controlled switch 28 includes a differential pair of transistors 196 including a transistor 198 and a transistor 200. Transistor 198 has its base biased by the clock signal $\phi$ via a line 202 while transistor 200 is base biased by the clock signal $\overline{\phi}$ over a line 204. The emitter of transistor 198 and emitter of transistor 200 are coupled in common to input line 12 carrying input current $I_{in}$.

The collector of transistor 198 is coupled to junction 26 and hence input 16, while the collector of transistor 200 is coupled to source $V_{CC}$ and hence away from input 16.

Switch 32 includes a differential pair of transistors 206 having a transistor 208 and a transistor 210. Transistor 208 is base biased by clock signal $\overline{\phi}$ via line 204 while transistor 210 is base biased by clock signal $\phi$ via line 202. The emitter of transistor 208 and emitter of transistor 210 are coupled in common to feedback line 24. The collector of transistor 208 is coupled to junction 26 and hence input 16, while the collectr of the transistor 210 is coupled to source $V_{CC}$ and hence away from input 16.

In the operation of switch 28, when clock signal $\phi$ high, transistor 198 is turned on, transistor 200 is turned off, transistor 208 is turned off and transistor 210 is turned on. Accordingly, input line 12 is coupled directly through transistor 198 and junction 26 to input 16 so that input current $I_{in}$ is directed from line 12 through transistor 198 to input 16 as current $I'_{in}$. Also, any signal $I''_{in}$ on line 24 is directed away from input 16 via transistor 210.

When signal $\overline{\phi}$ is high, signal $\phi$ is low, so that transistor 198 is turned off, transistor 200 is turned on, transistor 208 is turned on, and transistor 210 is turned off. Consequently, input line 12 is coupled to source $V_{CC}$ and away from input 16, while feedback line 24 is coupled directly through transistor 208 to input 16, whereby the regenerated current $I''_{in}$ is directed from line 24, through transistor 208 and junction 26 to input 16 as received current $I'_{in}$.

In the overall operation of latched adder 10, when a given input current $I_{in}$ of any multivalue of logic 0 through logic 7 is on input line 12, switch 30 is closed and switch 32 is opened for a setup mode. Consequently, current $I'_{in}$, which is current $I_{in}$, is decoded by quantizer 14 to produce the current $I_{sum}$ on output 18, the current $I_{carry}$ on output 20 and the regenerated current $I''_{in}$ on output 22. Circuit 120, via voltage $V_2$, will have set the values of voltages $V_{S1}$, $V_{S2}$ and $V_{S3}$ for quantizing this given input current $I'_{in}$.

Then, switch 32 is closed and switch 30 is opened to place adder 10 in a hold mode. In this hold mode, the regenerated current $I''_{in}$ is directed to input 16 as current $I'_{in}$, whereby the adder 10 statically stores the data and continually produces the current $I_{sum}$ and current $I_{carry}$ on the respective output 18 and output 20, as well as the current $I''_{in}$ on output 22. Any other input currents $I_{in}$ on line 12 will not be processed until the adder 10 is switched again to the setup mode.

Thus, quantizer 14 performs the functions of quantizing the input current $I_{in}$, producing the sum and carry outputs, and storing or latching this data. All of these functions are carried out with the same pairs of transistors shown in FIG. 2 during the setup and hold modes. In other words, separate transistors (and resistors) are not required for performing the separate arithmetic and latching functions, resulting in a reduction in the number of transistors and resistors that otherwise would be needed.

Furthermore, the input current $I_{in}$ and regenerated current $I''_{in}$ are directly coupled to input 16 through simple clock controlled switch 30 in the input line 12 and clock controlled switch 32 in the feedback line 24, which switches require only a few transistors to implement. Also, since the feedback line 24 is opened by switch 32 in the setup mode, any transients that might appear on line 24 will not affect the input current $I_{in}$ so that proper data can be processed by adder 10. Also, since the adder 10 operates on current signals, less power is required that if voltage signals were being processed.

Other aspects, objects and advantages of this invention can be obtained from a study of the drawings, the disclosure and the appended claims.

I claim:

1. A synchronous latched multivalued full adder for processing a first input current having any one of a plurality of multivalues, comprising:
   (a) quantizer means, having an input, a first sum output, a second carry output and a third output, for generating a sum logical output current at said first sum output and a carry logical output current at said second carry output in response to current being received at said input and for regenerating the received current in response to the sum logical output current and the received current at said input to produce a second regenerated current at said third output;
   (b) first means for directing the first input current to said input of said quantizer means;
   (c) second feedback means for directing the second regenerated current from said third output to said input of said quantizer means, and
   (d) clock controlled switch means for decoupling and coupling said first directing means and for coupling and decoupling said second feedback directing means, respectively, from said input of said quantizer means to direct the second regenerated current or the first input current to said input of said quantizer means as the received current.

2. A synchronous latched multivalued full adder according to claim 1 wherein said quantizer means comprises:
   (a) a plurality of means for individually detecting the value of the received current at said input and for generating individual logical currents;
   (b) means for summing the individual logical currents to produce the sum logical current;
   (c) means for detecting the value of the received current at said input to produce the carry logical current; and
   (d) means for converting the sum logical current and the received current at said input to the second regenerated current.

3. A synchronous latched multivalued full adder according to claim 2 wherein said means for converting comprises:
   (a) means, responsive to the received current at said input, for producing a voltage proportional to the received current;
   (b) means, having a carry voltage threshold, for comparing the voltage to said carry voltage threshold, said comparing means producing one value of current or another value of current depending on whether the voltage is greater or less than the carry voltage threshold; and
   (c) means for combining the sum logical current and the one or the other value of current to produce the second regenerated current.

4. A synchronous latched multivalued full adder according to claim 2 wherein said plurality of means for individually detecting comprises:
   (a) means for generating a voltage proportional to the received current at said input; and
   (b) a plurality of means, each having a distinct voltage threshold, for comparing the voltage to each said distinct voltage threshold.

5. A synchronous latched multivalued full adder according to claim 4 wherein said quantizer means further comprises means for shifting each said distinct voltage threshold in response to the received current at said input.

6. A synchronous latched multivalued full adder according to claim 4 wherein said plurality of means for comparing each comprises a thresholded differential pair of transistors, one of said transistors being biased by the voltage and the other of said transistors having said distinct voltage threshold.

7. A synchronous latched multivalued full adder according to claim 4 wherein said means for detecting the value of the received current to produce the carry logical current comprises means, having a carry voltage threshold, for comparing the voltage to said carry voltage threshold.

8. A synchronous latched multivalued full adder according to claim 7 wherein said means for comparing the voltage to said carry voltage threshold comprises a thresholded differential pair of transistors, one of said transistors being biased by the voltage and the other of said transistors having said carry voltage threshold.

9. A synchronous latched multivalued full adder according to claim 1 wherein said clock controlled switch means comprises:
   (a) a first pair of transistors being coupled to said first directing means;
   (b) a second pair of transistors being coupled to said second feedback directing means; and
   (c) means for clocking said first pair of transistors and said second pair of transistors to transfer the first input current to said input while transferring the second regenerated current away from said input and for clocking said first pair of transistors and said second pair of transistors to transfer the second regenerated current to said input while transferring the first input current away from said input.

10. A synchronous latched multivalued full adder according to claim 9 wherein:
    (a) said first pair of transistors comprises a first differential pair having first and second transistors;
    (b) said second pair of transistors comprises a second differential pair having third and fourth transistors; and
    (c) said means for clocking generates clock pulses to turn on said first and fourth transistors while turning off said second and third transistors and clock pulses to turn on said second and third transistors while turning off said first and fourth transistors.

11. A synchronous latched quaternary full adder for processing a logical input current having any one of eight values, comprising:
    (a) a quantizer having an input for receiving current, a first sum output, a second carry output, a third output, means for converting the received current at said input to a voltage proportional to the value of the received current, first means, having a first voltage threshold, for comparing the voltage to the first voltage threshold to generate first uncomplemented and complemented logical currents, second means, having a second voltage threshold, for comparing the voltage to the second voltage threshold to generate second uncomplemented, and complemented logical currents, third means, having a third voltage threshold, for comparing the voltage to the third voltage threshold to generate third uncomplemented and complemented logical currents, first means for summing the first, second and third uncomplemented logical currents to produce a sum uncomplemented logical current, second means for summing the first, second and third complemented logic currents to produce a sum complemented logical current, means, having a carry voltage threshold, for comparing the voltage to said carry voltage threshold to produce a carry logical current at said carry output, and means for converting the sum complemented logic current and the received current at said input to a second regenerated current at said third output corresponding to the received current at said input;

(b) means for shifting each said first, said second and said third voltage thresholds the same amount in response to the received current having a range of values above or below a predetermined value;

(c) first means for directing the first input current to said input;

(d) second feedback means for directing the second regenerated current on said third output to said input; and (e) clock controlled switch means for coupling said first directing means to said input while decoupling said second feedback directing means from said input and for coupling said second feedback directing means to said input while decoupling said first directing means for said input.

12. A synchronous latched quaternary full adder according to claim 11 wherein said first, said second and said third means for comparing each comprises a thresholded differential pair of transistors, one of said transistors being biased by the voltage and the other of said transistors having one of the voltage thresholds, and wherein said one transistor is coupled to said second summing means and said other transistor is coupled to said first summing means.

13. A synchronous latched quaternary full adder according to claim 12 wherein said means for converting the received current to a voltage comprises:

(a) means for generating a first voltage in response to the received current; and (b) emitter follower transistor means for reducing the first voltage to a second voltage.

14. A synchronous latched quaternary full adder according to claim 12 wherein said clock controlled switch means comprises:

(a) a first pair of first and second transistors for transferring the input current to or away from said input;

(b) a second pair of third and fourth transistors for transferring the second regenerated current to or away from said input; and (c) means for generating clock pulses to turn on said first and fourth transistors while turning off said second and third transistors and for generating clock pulses to turn on said second and third transistors while turning off said first and fourth transistors.

* * * * *

UNITED STATES PATENT AND TRADEMARK OFFICE
CERTIFICATE OF CORRECTION

PATENT NO. : 4,390,962

DATED : June 28, 1983

INVENTOR(S) : Karl W. Current

It is certified that error appears in the above-identified patent and that said Letters Patent is hereby corrected as shown below:

Column 3, line 4, "$I_{in}$" should be "$I'_{in}$".

Signed and Sealed this

Twenty-fourth Day of January 1984

[SEAL]

Attest:

GERALD J. MOSSINGHOFF

Attesting Officer

Commissioner of Patents and Trademarks